United States Patent [19]

Kuster et al.

[11] Patent Number: 4,659,313

[45] Date of Patent: Apr. 21, 1987

[54] CONTROL YOKE APPARATUS FOR COMPUTERIZED AIRCRAFT SIMULATION

[75] Inventors: Robert J. Kuster, Belle Mead; Jay B. Ross, Pennington, both of N.J.

[73] Assignee: New Flite Inc., Pennington, N.J.

[21] Appl. No.: 794,131

[22] Filed: Nov. 1, 1985

[51] Int. Cl.⁴ ............................................. G09B 9/08
[52] U.S. Cl. .................................................... 434/45
[58] Field of Search ............... 434/45; 446/7; 272/1 C

[56] References Cited

U.S. PATENT DOCUMENTS

| | | | |
|---|---|---|---|
| 2,804,698 | 9/1957 | Grandmont | 434/45 |
| 2,937,458 | 5/1960 | Leuthold | 434/45 |
| 3,024,539 | 3/1962 | Rider | 434/45 |
| 3,031,775 | 5/1962 | Cohen | 434/45 |
| 3,918,021 | 11/1975 | Nishioka et al. | 273/148 B X |
| 4,386,914 | 6/1983 | Dustman | 434/32 |
| 4,478,407 | 10/1984 | Manabe | 434/45 X |
| 4,599,070 | 7/1986 | Hladky et al. | 434/45 |

*Primary Examiner*—William H. Grieb
*Attorney, Agent, or Firm*—Richard C. Woodbridge

[57] ABSTRACT

An aircraft control yoke apparatus includes an inexpensive mechanism for manipulating a two axis variable transducer and is especially adaptable for use with microcomputers. The apparatus includes a control wheel attached at one end to a shaft which is in turn supported by a linear bearing. The linear bearing permits the shaft to rotate and simultaneously move back and forth. A crank mechanism is attached to the other end of the shaft and serves to amplify the rotational movement of the steering wheel. A resilient, elastic material like natural isoprene rubber connects the crank to a two axis variable transducer. The elastic material causes the two axis transducer to follow the motion of the rotational and back and forth movement of the steering wheel. A return-to-center mechanism causes the wheel to return to a neutral position when no force is applied to it. A very life-like simulation of airplane flight is achieved with a minimum of expense and a high degree of realism.

14 Claims, 10 Drawing Figures

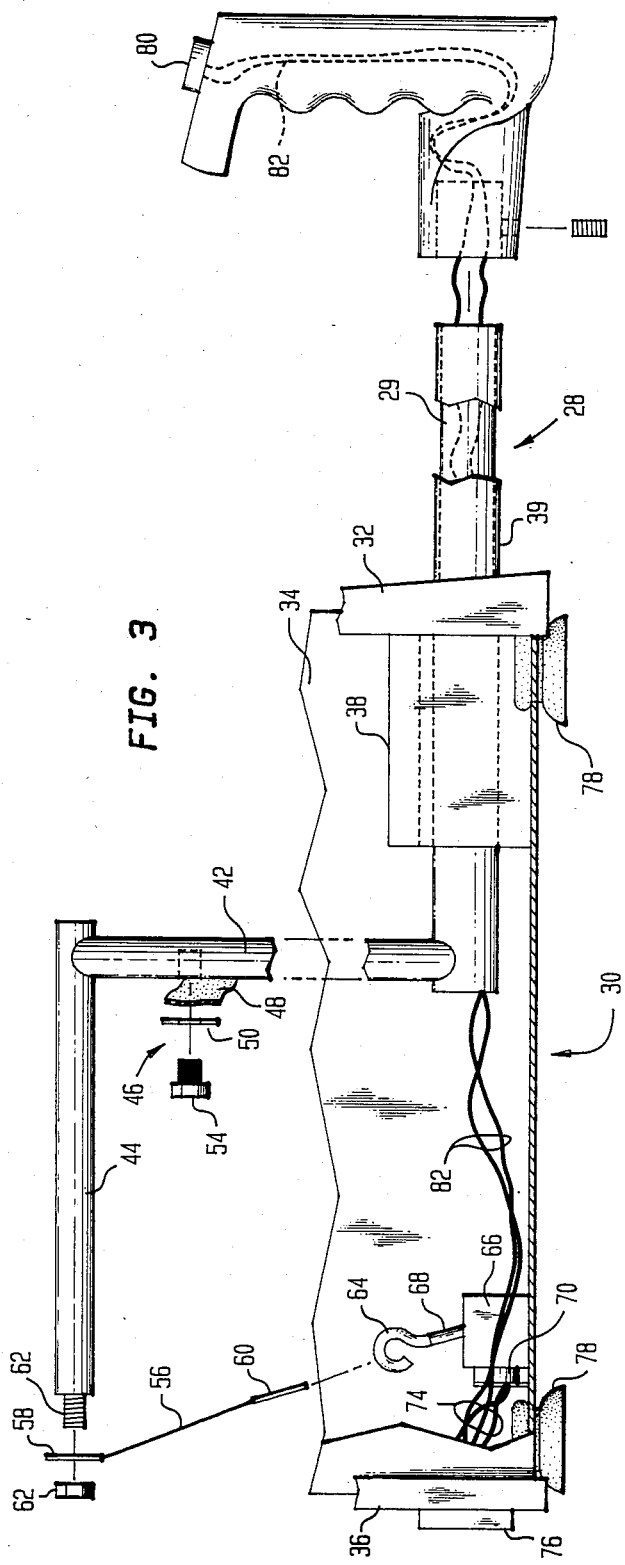

CONTROL YOKE APPARATUS FOR COMPUTERIZED AIRCRAFT SIMULATION

BACKGROUND OF THE INVENTION

1. Field of the Invention

This invention relates to a control yoke apparatus for use with a microcomputer programmed for aircraft simulation.

2. Description of the Prior Art

The recent growth of the use of personal computers has spawned a variety of interesting computer similation games. Perhaps the most interesting of the group are programs designed to simulate the take off and landing of aircraft. See for example, Flight Simulator TM developed and sold by Microsoft, Inc., of Bellevue, Wash. Most of such games are played using a simple X-Y joy stick in conjunction with a standard keyboard that acts as a throttle input. It is also possible to use two joy sticks, one for the maneuvering of the simulated aircraft and the other for throttle simulation. Aircraft simulation programs have significant potential. First of all, the programs teach a certain amount of skill and dexterity. Second, there is the possibility that they could be used for flight certification purposes and training given their high degree of perceived authenticity. Unfortunately, the greatest deficiency of prior art software simulations is that the little joy sticks are a generally unsatisfactory substitute for real cockpit equipment. Therefore it was a major object of this invention to replace unauthentic little joy sticks with a highly reliable, inexpensive control wheel equivalent that would give the user a greater sense of actual flight conditions.

Flight simulation equipment has been used for a number of years to train and retrain pilots and to familiarize newcomers with the basic of aviation. A typical Trainer Control Column Mechanism is described in U.S. Pat. No. 3,024,539. That patent generally discloses a flight simulator employing stationary mounted transducers operating by a wheel control through intermediate gearing. A torsion rod returns the wheel to its neutral position. A rotatable axial shaft is held in place by a reciprocating, non-rotary block which in turn is supported by a stationary block. Unfortunately the device described in that patent is relatively complicated, moderately expensive and not as realistic as the device taught in the present invention. In particular, there is nothing analogous to the unique crank arrangement of the present invention which, when combined with a resilient spring-like member controls an X-Y, two axis variable transducer in a realistic fashion. The device described in U.S. Pat. No. 3,024,539 would probably be too expensive and elaborate for the type of consumers who purchase personal computers and use aircraft simulation software programs.

There are other prior art aircraft simulation references of possible interest. For example, U.S. Pat. No. 4,386,914 discloses an embdiment employing a wheel and a spring return mechanism. U.S. Pat. No. 2,937,458 discloses a flight simulator apparatus employing a potentiometer mechanism. U.S. Pat. No. 3,918,021 discloses a joy stick used for manipulating a plurality of resistors located at 90° with respect to each other. This arrangement is typical of the structure of many game modern joysticks. U.S. Pat. No. 4,478,407 describes a Monitor Game Machine including a steering device. In and out manipulation of the steering device in addition to rotational manipulation causes the apparatus to send control signals to the game machine. U.S. Pat. No. 2,804,698 discloses an apparatus for simulating the control loading and feel of an aircraft. It includes the use of a joy stick and a linear bearing. Lastly, U.S. Pat. No. 3,031,775 describes a flight simulator which includes a joy stick for controlling a pair of potentiometers.

In general, prior art flight simulators are relatively expensive and complicated devices. There has been very little interest until recently in a mass produced mechanism for use with aircraft simulation software in the context of personal computers. The present invention permits the basic joy stick mechanism of a modern personal computer to be manipulated in an entirely realistic fashion by an aircraft wheel. There don't appear to be any other inexpensive devices that produce the same high degree of realistic simulation.

SUMMARY OF THE INVENTION

Briefly described, the invention comprises a control yoke apparatus for use with personal computers. Software is presently available in diskette form that permits a personal computer to simulate the take off and landing of an aircraft. A joy stick including a pair of X-Y potentiometers is used to simulate the joy stick of an actual aircraft. The throttle control of the aircraft may be simulated by a second joy stick or through manipulation of a keyboard button. However, the small joy stick used with a modern personal computer is not a satisfactory equivalent of the controls used for most modern aircraft. Rarely is the.toy-like joy stick used with a personal computer more than 2" or 3" long. In addition, most modern aircraft employ a wheel which may be manipulated right or left or forward and backward to control the flight of the aircraft. Therefore, a clear need was identified for a device that would simulate the aircraft control wheel of a modern airplane so that it could be interfaced with software used for aircraft simulation on personal computers.

The present device includes a steering wheel attached to a shaft which in turn is supported by a linear bearing. The linear bearing permits the shaft to rotate left and right and move forward and backward. An L-shaped crank mechanism is attached to the other end of the shaft. The attached end of the crank mechanism is attached by a piece of resilient elastic, rubber-like material to the lever control of an X-Y, two axis variable transducer. The crank mechanism serves to transform rotation of the wheel into rotation of the basic joy stick mechanism. Similarly, the offset of the crank mechanism permits the joy stick to respond to the forward and backward movement of the wheel shaft. The elastic connecting material allows the distance between the end of the joy stick mechanism and the free end of the crank member to vary without disturbing the general relationship of the other parts of the apparatus. The elastic, rubber-like material also gives the flight simulation device a realistic feel and response. A return to center mechanism including a second elastic material serves to return the joy stick to a neutral upright position when no force is applied to the control wheel.

These and other aspects of the present invention will be better understood by reference to the following drawings and detailed description of the invention.

BRIEF DESCRIPTION OF THE DRAWINGS

FIG. 3 is a side elevational exploded view of the preferred embodiment of the invention.

DETAILED DESCRIPTION OF THE PREFERRED EMBODIMENT

During the course of this description like numbers will be used to identify like elements according to the different figures which illustrate the invention.

The control yoke apparatus can be thought of as an adapter for converting the natural motions of an aircraft control wheel to the motions necessary to manipulate a basic joy stick mechanism.

Figure 1:
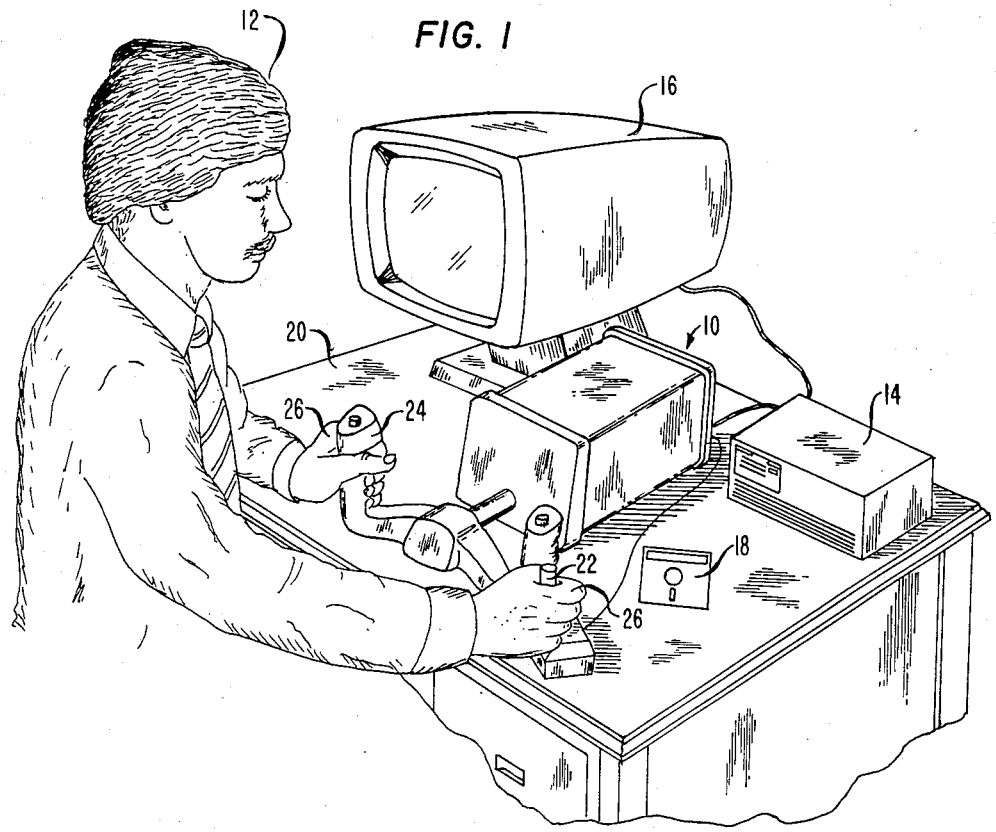
FIG. 1 is a perspective view of the preferred embodiment of the aircraft control simulator invention illustrated in the context of a user and a personal computer.

The invention 10 is illustrated in FIG. 1 in the context in which it would typically be found. A user 12 sits in front of the flight simulator wheel 24 which is connected to a conventional personal computer 14. The personal computer 14 could be any conventional microcomputer such as made by IBM, Apple, or other personal computer manufacturers which accept aircraft simulation software programs. The personal computer 14 and its associated monitor 16 rest on table 20. Software diskette 18, which might comprise the Microsoft Flight Simulator TM software such as sold by Microsoft, Inc., Bellevue, Washington is used to load the software program into the personal computer 14 in the conventional fashion. The Microsoft Flight Simulator TM program is designed to simulate the performance of a Cessna 182. However, other aircraft simulation software programs are also available. For example, The Sublogic Corporation of Champaign, Illinois produces a program known as Jet TM to simulate military aircraft such as the F-16 or F-18. A joy stick 22 is attached to a 15 pin DE-15 game port connector 76 in the back of chassis 30 and acts as an aircraft throttle simulator. Operator 12 typically sits with both hands 26 on control wheel 24. However, the operator 12 may remove one hand 26 from wheel 24 in order to manipulate throttle control joy stick 22.

Figure 2:
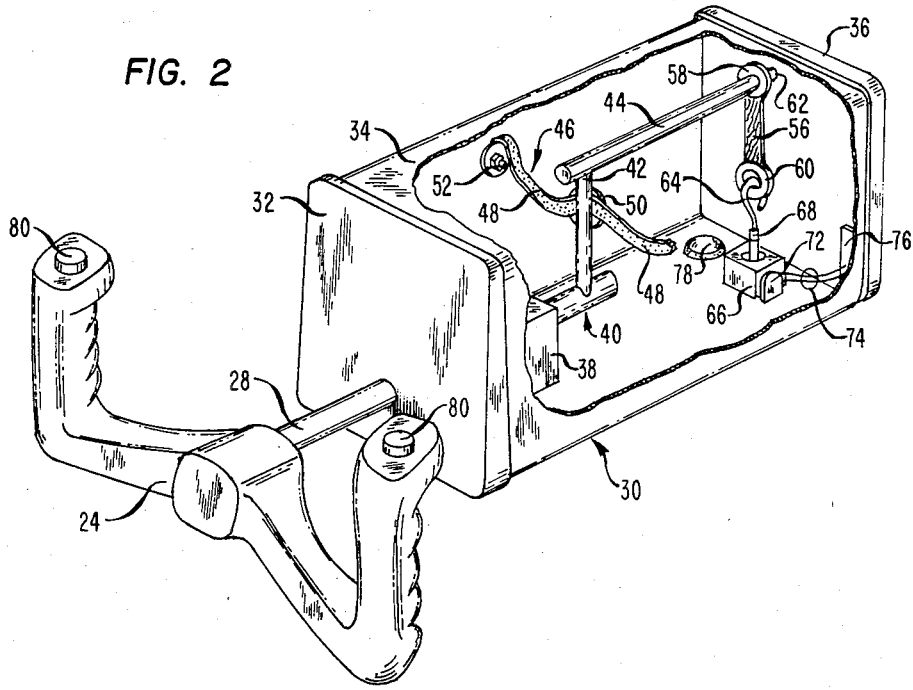
FIG. 2 is a perspective, partial cutaway view of the preferred embodiment of the invention.

FIGS. 2 and 3 provide a more detailed understanding of the structure of the invention. The internal mechanism of the invention 10 is housed in a chassis 30 which includes a front section 32, a middle section 34 and a rear section 36. Wheel 24 is attached to shaft 28 which passes through the front chassis section 32 and is supported by a linear bearing 38. Linear bearing 38 supports the weight of the shaft 28 and wheel 24 in such a way as to permit the shaft 28 to rotate and move backward and forward within bearing 38. The shaft 28 is preferably formed around an aluminum tube 29 having a wall thickness of about ⅛". A sleeve 39 of acrylic plastic is molded around the aluminum tube 29 as part of the process which also forms the vertical portion 42 and the horizontal portion 44 so that shaft 28 and portions 42 and 44 are part of one integrated crank structure 40. Acrylic plastic is available from Cyro Industries, Sanford, Me. The bearing 38 is preferably made of a high density, high impact, low coefficient of friction plastic such as Delrin ®. Delrin ® is available from the Hyde Company of Grenloch, N.J. If desired the bearing 38, chassis sections 32 and 36 and control wheel 24 can also be injection molded from plastic. A return to center mechanism 46 includes a resilient elastic band 48 attached at its two extreme ends to anchors 52 in the vertical sidewalls of chassis mid-section 34. A grommet 50 in the center of the resilient band 48 loosely engages an anchor pin 54 on the vertical portion 42 of crank 40. The purpose of return to center mechanism 46 is to bring the vertical portion 42 back to a neutral vertical orientation when the operator 12 takes his hands 26 off of control wheel 24. (See FIGS. 4B and 4E).

Crank mechanism 40 is connected to an X-Y two axis variable transducer 66 by another resilient elastic band 56. Resilient band 56 includes an upper grommet 58 and a lower grommet 60 integrally attached at opposite ends. Upper grommet 58 loosely engages an anchor pin 62 on horizontal crank member 44. Similarly, lower grommet 60 engages a hook 64 on control rod 68 of the X-Y two axis variable transducer 66. The X-Y, two axis variable transducer 66 is commercially available and identical to joy stick transducers presently available on the market. According to the preferred embodiment the X-Y, two axis variable transducer is basically the same as the Model JS-150K joy stick mechanism available from Jameco Electronics, 1355 Shoreway, Belmont, Calif. 94002. Other brands and models would also be acceptable. Control rod 68 is connected by a conventional linkage to an X axis potentiometer 70 and a Y axis potentiometer 72. Therefore manipulation of control rod 68 causes X and Y translation of potentiometers 70 and 72 respectively. The potentiometers 70 and 72 have a maximum value of 150 K ohms. Other potentiometers having a maximum value in the range of 50 K ohms to 250 K ohms would also be acceptable. The varying potential of potentiometers 70 and 72 is communicated by wires 74 to the plug that goes into the computer. Another set of wires 74 goes to plug 76. Joy stick 22 would typically be plugged into plug 76 in order to control the throttle of the simulated aircraft. Rubber feet 78 are also attached to the bottom of the middle section 34 of the chassis 30 in order to keep the invention 10 from moving. Optional fire buttons 80 may be attached to the top of the handles on control wheel 24 in order to simulate the firing of guns or missiles, etc. Fire buttons 80 are connectable via wires 82 which travel through wheel shaft 28 and which are also connectable through wires 74 to other portions of the personal computer 14.

Elastic materials 48 and 56 are preferably formed from a natural isoprene rubber such as can be obtained from the B. F. Goodrich Company of Akron, Ohio. Sheets of the material can be purchased having dimensions of 24 inches wide, 10 feet long and a thickness of 1/16 to ⅛ of an inch. The modulus of elasticity range typically from 300% to 600%. The strips 48 and 56 are preferably cut into widths of ⅜".

Figure 4A:
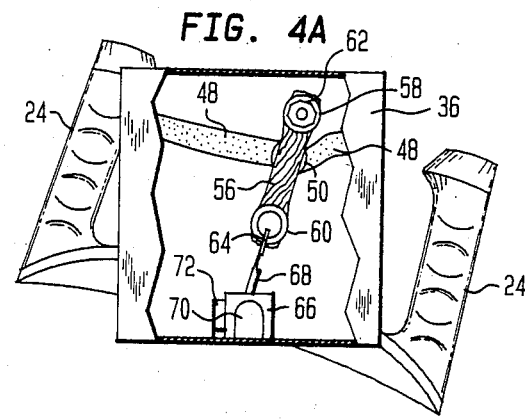
FIG. 4A is a schematic view of the invention shown with the wheel executing a left turn.
Figure 4B:
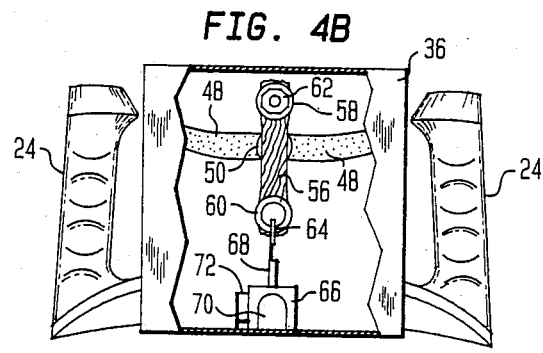
FIG. 4B shows the wheel in its neutral, straight-up position as it might proceed from a left turn to a right turn.
Figure 4C:
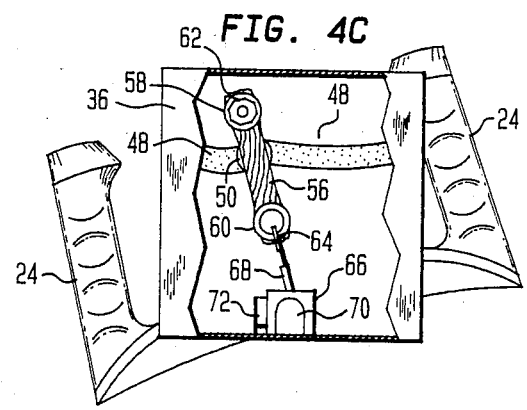
FIG. 4C is a schematic representation of the wheel shown executing a right hand turn.
Figure 4D:
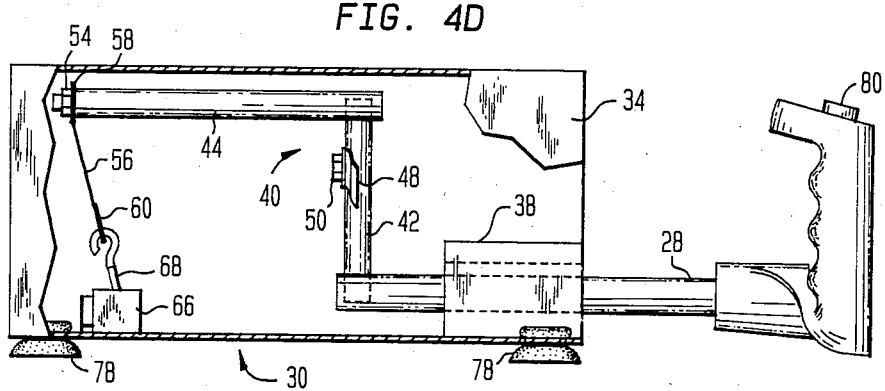
FIG. 4D is a schematic representation of the invention as it executes a forward, nose down maneuver.
Figure 4E:
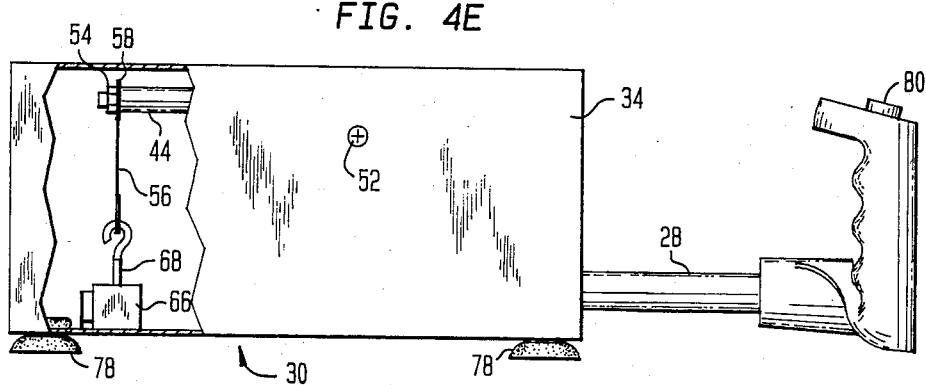
FIG. 4E is a schematic illustration of the neutral position of the apparatus as it proceeds from a forward, nose down position to a backward nose up position.
Figure 4F:
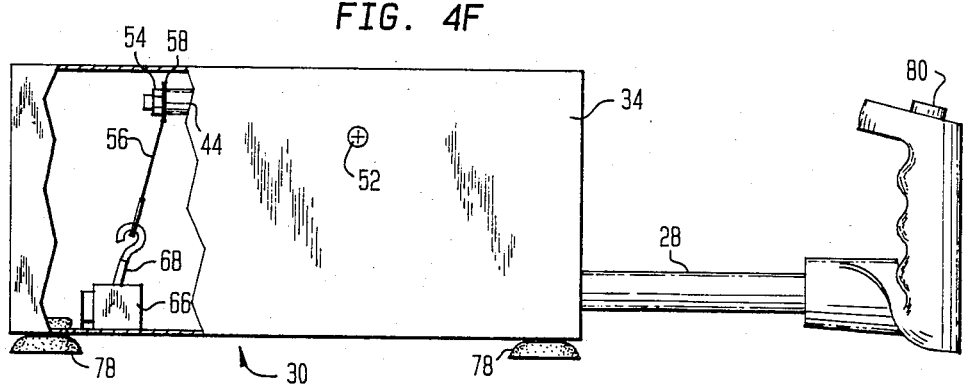
FIG. 4F is a schematic illustration of the invention in the wheel back, nose up attitude.
Figure 4G:
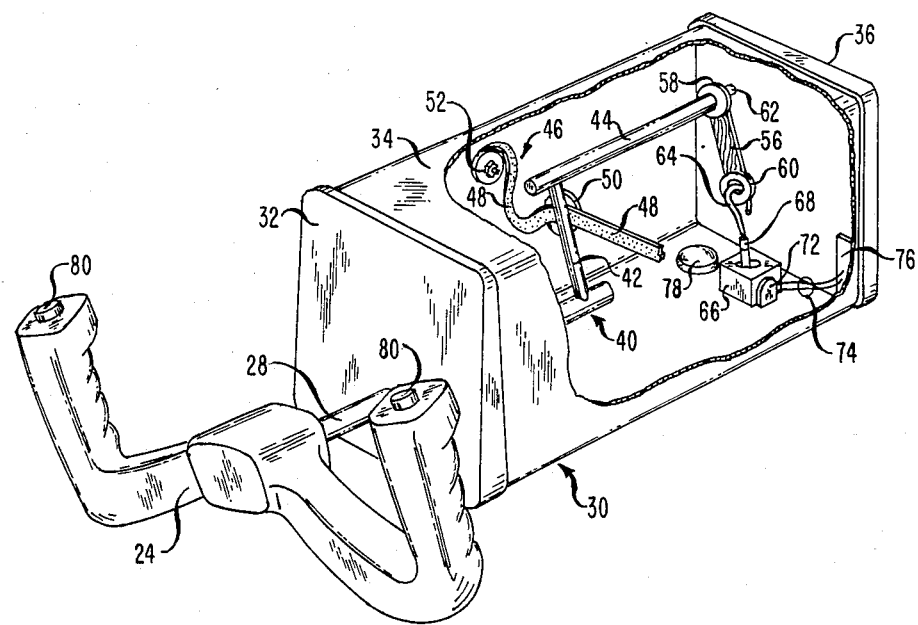
FIG. 4G is a schematic illustration of the invention as it executes a compound maneuver.

In order to operate the control yoke apparatus the user 12 typically turns on the personal computer 14 and loads in the conventional software 18 as he would with any prior art aircraft simulator program. The simulator invention 10 is then connected to the output port on the personal computer 14 normally intended for the prior art joy stick. The throttle joy stick 22 is then connected to the plug 76 in the rear of simulator invention 10. The operator 12 then follows the instructions on the monitor 14. However, instead of manipulating a joy stick to achieve flight control the operator 12 uses the control wheel 24 instead. For example, if the operator wishes to make a left hand turn the control wheel 28 is rotated in the manner illustrated in FIG. 4A. Alternatively, if the operator wishes to make a right hand turn the control wheel 28 is rotated in the manner shown in FIG. 4C. Between the extreme left hand turn shown in FIG. 4A and the right hand turn shown in FIG. 4C the X-Y, two axis variable transducer 66 passes through an X neutral position as shown in FIG. 4B. If the pilot desires to force the nose of the aircraft downward the control wheel 24 is pushed forward as shown in FIG. 4D. Conversely, if the pilot wishes to execute a nose up, or take off maneuver then the control wheel 24 is drawn backwards into the position illustrated in FIG. 4F. When the control wheel 24 goes from the full forward position shown in FIG. 4D to the full backward position shown in FIG. 4F, it passes through a Y neutral position as shown in FIG. 4E similar to the X neutral position illustrated in FIG. 4B. In addition to left and right and forward and back maneuvers, the pilot 12 can also execute compound maneuvers, such as a left hand turn combined with a nose down attitude such as the pilot might perform while executing a banked landing. See, for example, FIG. 4G which illustrates a typical compound maneuver.

There are numerous advantages to the present invention. First of all, the apparatus is considerably less expensive to build and maintain than prior art devices. Second, the device has a tremendously realistic feel to it. It is very similar to a real aircraft where the pilot, especially in small planes, can feel the resistance to the controls in a dynamic fashion. The elastic, resilient strips 48 and 56 provide a very real sense of dealing with a fluid medium. Third, because the realism is so high it is possible to use the invention to train potential pilots in a very believable setting.

There are certain changes that could be made to the invention if desired. For example, as previously discussed it would be possible to add fire buttons 80 for simulated guns or missiles. Also, resilient members 46 and 56 are preferably solid rubber-like materials such as natural isoprene. Heavy gauge, conventional rubber bands also work well. However, they could be replaced by conventional mechanical springs, elastic fabrics, rubber tubes or the like. It is possible to add the throttle mechanism 22 onto the control wheel 24 in a manner similar to the mounting of fire buttons 80. It will also be appreciated that a similar mechanism might be usable for the control of other devices such as automobile simulators, video game simulators, boat simulators, etc.

While the invention has been described with reference to the preferred embodiment thereof, it will be appreciated by those of ordinary skill in the art that various modifications can be made to the elements of the invention without departing from the spirit and scope thereof.

We claim:

1. A control yoke simulation apparatus comprising:
   hand manipulatable means;
   shaft means having a long axis and connected to said hand manipulatable means;
   bearing means for supporting said shaft means to that said shaft means can move back and forth in said bearing means in the direction of the long axis of said shaft means;
   crank means attached to said shaft means for amplifying the rotational movement of said shaft means;
   first resilient means connected to said crank means; and,
   transducer means attached by said first resilient means to said crank means for translating said rotational movement into an output indicative of the movement of said hand manipulatable means.

2. The apparatus of claim 1 wherein said bearing means comprises a linear bearing.

3. The apparatus of claim 2 wherein said first resilient means comprises an elastic, rubber-like material.

4. The apparatus of claim 3 wherein said hand manipulatable means comprises a steering means for manipulation by two hands.

5. The apparatus of claim 4 wherein said steering means comprises a control wheel.

6. The apparatus of claim 5 wherein said crank means comprises:
   a radial section attached at one end to said shaft means and having an axis substantially perpendicular to the long axis of said shaft means; and,
   a horizontal section attached at one end to said radial section and at the other end to said elastic, rubber-like material, said horizontal section having an axis substantially parallel to the long axis of said shaft means.

7. The apparatus of claim 6 further comprising:
   return to center means for returning said transducer means to a neutral positon when said control wheel is free of hand manipulation.

8. The apparatus of claim 7 further comprising:
   fire button means mounted on said control wheel for simulating the trigger mechanism of a weapons system.

9. The apparatus of claim 7 wherein said return to center means includes:
   a second resilient means;
   means for attaching a first part of second resilient means to said radial section of said shaft means; and,
   means for attaching a second part of said second resilient means to an anchor means that does not move with respect to said bearing means.

10. The apparatus of claim 9 further comprising:
    aircraft engine throttle simulation means electrically connected to said apparatus for simulating an aircraft engine throttle.

11. A simulation apparatus comprising:
    rotatable aircraft control means for hand manipulation;
    a shaft connected at one end to said control means;
    bearing means for supporting said shaft;
    rotation amplifying means attached to said shaft for amplifying the rotational movement of said shaft;
    resilient means attached to said rotation amplifying means; and, two axis transducer means attached to said resilient means for transforming the rotational motion and back and forth motion of said control means into an electrical output.

12. The apparatus of claim 11 wherein said two axis transducer means comprises a device including:
   a first variable resistor means having a resistance that varies in direct proportion to motion in a first direction; and,
   a second variable resistor means having a resistance that varies in direct proportion to motion in a second direction different from said first direction.

13. The apparatus of claim 12 wherein said first direction is substantially perpendicular to said second direction.

14. A simulation apparatus comprising:
   control wheel means for rotational and back and forth hand manipulation;
   a shaft connected to said control wheel means;
   bearing means for supporting said shaft and for permitting said shaft to rotate and move in a back and forth direction;
   crank means attached to said shaft for amplifying the rotational movement of said shaft;
   a resilient means attached to said crank means; and,
   a two axis transducer means attached to said resilient means, said two axis transducer means including at least two variable resistor means whose resistance varies in relation to the motion of said control wheel means.

* * * * *